United States Patent
Zhao et al.

(10) Patent No.: US 11,824,714 B2
(45) Date of Patent: Nov. 21, 2023

(54) METHOD AND APPARATUS FOR UPDATING AN EDGE NODE, DEVICE, MEDIUM AND PROGRAM PRODUCT

(71) Applicant: BEIJING BAIDU NETCOM SCIENCE AND TECHNOLOGY CO., LTD., Beijing (CN)

(72) Inventors: Xin Zhao, Beijing (CN); Dayu Shen, Beijing (CN); Jingru Xie, Beijing (CN); Sheng Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 160 days.

(21) Appl. No.: 17/305,863

(22) Filed: Jul. 15, 2021

(65) Prior Publication Data

US 2021/0344556 A1    Nov. 4, 2021

(30) Foreign Application Priority Data

Dec. 21, 2020    (CN) .......................... 202011520231.7

(51) Int. Cl.
*H04L 41/082* (2022.01)
*H04L 41/08* (2022.01)

(52) U.S. Cl.
CPC ........ *H04L 41/082* (2013.01); *H04L 41/0886* (2013.01)

(58) Field of Classification Search
CPC ..... H04L 41/082; H04L 67/34; H04L 67/125; H04L 41/084; H04L 41/0813; H04L 41/0803; H04L 41/0886; H04L 41/0895
See application file for complete search history.

(56) References Cited

U.S. PATENT DOCUMENTS 8,572,597 B2 * 10/2013 Herle ................... H04W 8/245
                                                              717/172
10,768,920 B2 * 9/2020 Fontoura ................ G06F 8/65
(Continued)

FOREIGN PATENT DOCUMENTS

CN    108632101 A    10/2018
CN    108769214 A    11/2018
(Continued)

OTHER PUBLICATIONS

Chinese First Search Report issued from the Chinese Patent Office to CN Application No. 2020115202317 dated Dec. 21, 2020, 6 pages.
(Continued)

*Primary Examiner* — Hitesh Patel
*Assistant Examiner* — Alex H. Tran
(74) *Attorney, Agent, or Firm* — HUNTON ANDREWS KURTH LLP

(57) ABSTRACT

Provided are a method and apparatus for updating an edge node, a device, a medium and a program product which relate to the technical field of computers and in particular to the technical fields of edge computing, cloud computing and cloud services. In an embodiment, a module update instruction is received from a cloud server, where the module update instruction includes information about a to-be-updated module; an auxiliary unit or a master unit is used as a target module according to the information about the to-be-updated module, and the to-be-updated module is updated through the target module; and in a process of updating the to-be-updated module, data interaction is performed between the target module and the cloud server.

9 Claims, 4 Drawing Sheets

(56) References Cited

U.S. PATENT DOCUMENTS

| | | | |
|---|---|---|---|
| 10,819,577 B2* | 10/2020 | Prabhu | H04L 41/0895 |
| 10,990,372 B2* | 4/2021 | Sarkar | G06F 8/63 |
| 11,005,713 B2* | 5/2021 | Brown | H04L 41/085 |
| 11,099,827 B2* | 8/2021 | Ali | G06F 8/65 |
| 11,550,557 B2* | 1/2023 | Sharpe | G06F 21/6218 |
| 11,625,258 B2* | 4/2023 | Wang | G06F 8/60 718/1 |
| 2019/0036781 A1* | 1/2019 | Prabhu | H04L 41/12 |
| 2020/0097274 A1 | 3/2020 | Sarkar et al. | |
| 2022/0019422 A1* | 1/2022 | Anderson | H04L 67/10 |

FOREIGN PATENT DOCUMENTS

| | | | | |
|---|---|---|---|---|
| CN | 106502824 B | * | 6/2019 | |
| CN | 109873714 A | * | 6/2019 | |
| CN | 110716945 A | | 1/2020 | |
| CN | 108632101 B | * | 2/2020 | H04L 41/0813 |
| CN | 211787083 U | | 10/2020 | |
| CN | 112527381 B | * | 12/2021 | G06F 8/65 |
| CN | 114531467 A | * | 5/2022 | |
| RU | 2671624 C1 | * | 11/2018 | |

OTHER PUBLICATIONS

Chinese First Office Action issued from the Chinese Patent Office to CN Application No. 202011520231.7 dated Dec. 2, 2021, 10 pages.

Chinese Search Report, The State Intellectual Property Office of People's Republic of China, issued to CN Application No. 202011520231.7 dated Oct. 30, 2020, 3 pages.

Liu, L., et al., Timely Updates in MEC-Assisted Status Update Systems: Joint Task Generation and Computation Offloading Scheme, China Communications, Networks & Signal Processing, Aug. 2020, pp. 168-186, 19 pages.

Second Chinese Office Action, The State Intellectual Property Office of People's Republic of China, issued to CN Application No. 202011520231.7, dated Apr. 1, 2021, 7 pages.

XU,C., et al., An Edge Computing Architecture of Distributed Generation Microgrid and Its Application, Advances in New and Renewable Energy, 2020, 8(5), pp. 383-390, 6 pages.

* cited by examiner

METHOD AND APPARATUS FOR UPDATING AN EDGE NODE, DEVICE, MEDIUM AND PROGRAM PRODUCT

CROSS-REFERENCE TO RELATED APPLICATION(S)

This application claims priority to Chinese Patent Application No. 202011520231.7 filed Dec. 21, 2020, the disclosure of which is incorporated herein by reference in its entirety.

TECHNICAL FIELD

The present disclosure relates to the technical field of computers and in particular to the technical fields of edge computing, cloud computing and cloud services and in particular relates to a method and apparatus for updating an edge node, a device, a medium and a program product.

BACKGROUND

An edge computing system refers to an open platform that integrates the core capabilities of network, computing, storage and application on the side close to the sources of objects or data to provide the closest-end service nearby. The edge computing system application is initiated on an edge side to generate a faster network service response and meet the basic needs of the industry in real-time traffic, application intelligence, security and privacy protection.

In the existing art, data communication between an edge node and a cloud server is implemented through a master unit in the edge node.

SUMMARY

The present disclosure provides a method and apparatus for updating a to-be-updated module in an edge node, a device, a medium and a program product.

According to an aspect of the present disclosure, a method for updating an edge node is provided. The method includes steps described below.

A module update instruction is received from a cloud server, where the module update instruction includes information about a to-be-updated module.

An auxiliary unit or a master unit is used as a target module according to the information about the to-be-updated module, and the to-be-updated module is updated through the target module.

In a process of updating the to-be-updated module, data interaction is performed between the target module and the cloud server.

According to another aspect of the present disclosure, an apparatus for updating an edge node is provided. The apparatus includes an instruction receiving unit, a target module determination unit and a data interaction unit.

The instruction receiving unit is configured to receive a module update instruction from a cloud server, where the module update instruction includes information about a to-be-updated module.

The target module determination unit is configured to use an auxiliary unit or a master unit as a target module according to the information about the to-be-updated module and update the to-be-updated module through the target module.

The data interaction unit is configured to perform data interaction between the target module and the cloud server in a process of updating the to-be-updated module.

According to another aspect of the present disclosure, an electronic device is provided. The electronic device includes at least one processor and a memory.

The memory is communicatively connected to the at least one processor.

The memory stores instruction executable by the at least one processor, and the instructions are executed by the at least one processor to cause the at least one processor to perform any method in the present disclosure.

According to another aspect of the present disclosure, a non-transitory computer-readable storage medium is provided. The storage medium stores computer instructions for causing a computer to perform any method in the present disclosure.

According to another aspect of the present disclosure, a computer program product is provided. The computer program product includes a computer program which, when executed by a processor, causes the processor to perform any method in the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

During a research and development process, the applicant has found that in the existing art, data communication between an edge node and a cloud server is implemented through the master unit in the edge node. The master unit acquires update resource data from the cloud server and controls update of a to-be-updated module based on the update resource data. However, if the master unit itself is updated, the master unit in the edge node in the existing art cannot continue to provide normal services, and especially in the process of updating the master unit, the data communication between the master unit and the cloud server will be interrupted so that the information reported to the cloud server will be incoherent, which is unacceptable in some scenarios with high monitoring requirements.

Figure 1:
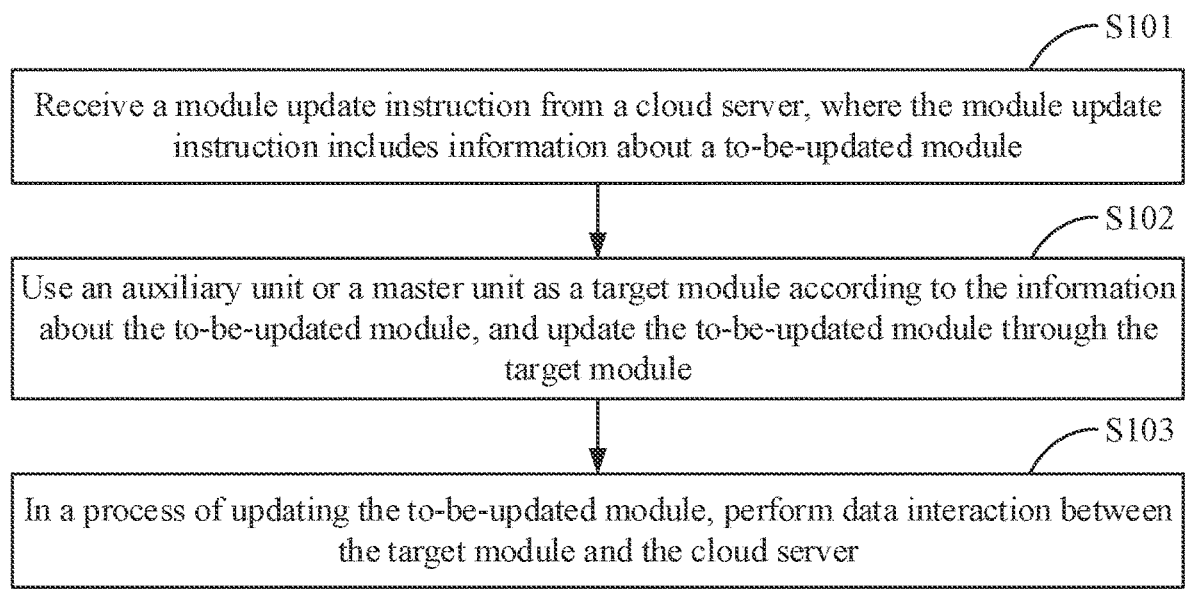
FIG. 1 is a flowchart of a method for updating an edge node according to an embodiment of the present disclosure.

FIG. 1 is a flowchart of a method for updating an edge node according to an embodiment of the present disclosure. This embodiment is applicable to the case of updating a to-be-updated module in the edge node. The method in this embodiment may be performed by an apparatus for updating an edge node. The apparatus may be implemented by software and/or hardware and integrated in any electronic device having a computing capability.

As shown in FIG. 1, the method for updating an edge node according to this embodiment may include the steps described below.

In S101, a module update instruction is received from a cloud server, where the module update instruction includes information about a to-be-updated module.

The cloud server is any electronic device having a data storage capability and a data processing capability. Data communication is performed between the cloud server and the edge node. The functions of the cloud server include, but are not limited to, information management, resource management, application update, node pre-allocation and remote debugging and may include node creation, application upload, node update, application update, resource information synchronization with a node, data interface provision and the like. The module update instruction is used for instructing the edge node to update the to-be-updated module. The information about the to-be-updated module in the module update instruction is used for indicating the to-be-updated module in the edge node. The information about the to-be-updated module includes, but is not limited to, the name, identification of the to-be-updated module or any information capable of distinguishing the identity of the unit.

In one embodiment, the cloud server transmits a module update instruction to the edge node, and the edge node receives the module update instruction through a communication unit configured in the edge node itself; the communication unit may be the master unit in the edge node, the auxiliary unit in the edge node or any unit having a data interaction capability in the edge node.

In another embodiment, the cloud server transmits a module update instruction to the edge node, and the edge node receives the module update instruction both through the auxiliary unit and the master unit.

The module update instruction is received from the cloud server, laying data foundation for the subsequent update of the to-be-updated module.

In S102, an auxiliary unit or a master unit is used as a target module according to the information about the to-be-updated module, and the to-be-updated module is updated through the target module.

The auxiliary unit, the master unit and another unit are included in the edge node. The functions of the auxiliary unit include, but are not limited to, the following: 1) installing the master unit in an initialization process; 2) being responsible for update and rollback of the master unit; 3) performing data interaction with the cloud server. The functions of the master unit include, but are not limited to, the following: 1) being responsible for update and rollback of the auxiliary unit and another unit; 2) performing data interaction with the cloud server; 3) establishing a debugging link with a specified unit or device; 4) accessing data and transmitting resources inside the edge node. The another unit is used for executing established business logic. In addition to various types of units, the edge node also includes a resource management center for receiving resource deployment information from the master unit, implementing deployment of resources and the like.

In one embodiment, the edge node analyzes the module update instruction, determines the information about the to-be-updated module included in the module update instruction, uses the auxiliary unit or the master unit as the target module according to a preset correspondence between the target module and the information about the to-be-updated module, and updates the to-be-updated module through the target module.

In one embodiment, S102 involves two implementation manners of A and B.

A: In response to the information about the to-be-updated module being the master unit, the auxiliary unit is used as the target module, and the master unit is updated through the auxiliary unit.

In one embodiment, data interaction is performed between the auxiliary unit and the cloud server, the auxiliary unit receives the module update instruction from the cloud server and determines whether the information about the to-be-updated module is the master unit by performing matching with the information about the to-be-updated module in the module update instruction according to the identification information of the master unit; if yes, the auxiliary unit is used as the target module and updates the master unit.

B: In response to the information about the to-be-updated module being the auxiliary unit or another unit, the master unit is used as the target module, and the auxiliary unit or the another unit is updated through the master unit.

In one embodiment, data interaction is performed between the master unit and the cloud server, the master unit receives the module update instruction from the cloud server and determines whether the information about the to-be-updated module is the auxiliary unit or the another unit by performing matching with the information about the to-be-updated module in the module update instruction according to the identification information of the auxiliary unit or the another unit; if yes, the master unit is used as the target module and updates the auxiliary unit or the another unit.

In response to the information about the to-be-updated module being the master unit, the auxiliary unit is used as the target module, and the master unit is updated through the auxiliary unit. In response to the information about the to-be-updated module being the auxiliary unit or another unit, the master unit is used as the target module, and the auxiliary unit or another unit is updated through the master unit. In this manner, the update of the master unit is merely the responsibility of the auxiliary unit, while the update of the auxiliary unit and another unit is the responsibility of the master unit, thus reducing the amount of data processing of the auxiliary unit, reducing the probability of errors in the update of the master unit, and ensuring the smooth and complete update of the most important core unit in the edge system.

In S103, in a process of updating the to-be-updated module, data interaction is performed between the target module and the cloud server.

Data interaction with the cloud server includes, but is not limited to, the following: the target module acquires unit information of all units in the edge node, such as unit version numbers, unit operation states, and unit operation data, and the target module sends the module information to the cloud server; correspondingly, the target module also receives a module update instruction or another instruction transmitted by the cloud server, including, for example, a data storage instruction, so that the edge node stores the to-be-stored data transmitted by the cloud server so as to reduce the storage pressure of the cloud server.

In one embodiment, in response to the information about the to-be-updated module being the master unit, the auxiliary unit is used as the target module, and data interaction is performed between the auxiliary unit and the cloud server.

In another embodiment, in response to the information about the to-be-updated module being the auxiliary unit or another unit, the master unit is used as the target module, and data interaction is performed between the master unit and the cloud server. Data interaction between the auxiliary unit and the cloud server and data interaction between the master unit and the cloud server are implemented through technologies including but not limited to websocket, http, mqtt or http3.

In another embodiment, the information about the to-be-updated module may simultaneously include the master unit, the auxiliary unit and another unit in the actual operation of the edge node. In order to ensure uninterrupted data interaction between the edge node and the cloud server, an alternate update strategy is adopted.

In an embodiment, firstly, the auxiliary unit is used as the target module, and the master unit is updated through the auxiliary unit; in the updating process, data interaction is performed between the auxiliary unit and the cloud server. After the update of the master unit is completed, the master unit is used as the target module, and the auxiliary unit or another unit is updated through the master unit. In the updating process, data interaction is performed between the master unit and the cloud server.

In another embodiment, the to-be-updated module may be the same as the target module in the actual operation of the edge node, for example, the to-be-updated module is the master unit, and the master unit is used as the target module, that is, the master unit updates the master unit itself. In order to ensure uninterrupted data interaction between the edge node and the cloud server, data interaction is performed between the cloud server and the master unit or auxiliary unit that is not the target module. For example, assuming that the master unit as the target module updates the master unit itself, data interaction is performed between the auxiliary unit and the cloud server. For example, assuming that the auxiliary unit as the target module updates the auxiliary unit itself, data interaction is performed between the master unit and the cloud server.

Data interaction is performed between the target module and the cloud server during the process of updating the to-be-updated module so that the edge node can still maintain data interaction with the cloud server during the module updating process.

According to the solution of this embodiment, the module update instruction is received from the cloud server, where the module update instruction includes information about the to-be-updated module. The auxiliary unit or the master unit is used as the target module according to the information about the to-be-updated module, and the to-be-updated module is updated through the target module. In the process of updating the to-be-updated module, the data interaction is performed between the target module and the cloud server. In this manner, the effect of updating the to-be-updated module in the edge node is achieved, and since the auxiliary unit has the function of data interaction with the cloud server, the edge node can still maintain data interaction with the cloud server through the auxiliary unit even if the master unit is in the updating process, thus avoiding the problem of incoherent information reported to the cloud server.

On the basis of the preceding embodiments, before S101, the method further includes the step described below.

The version information of each unit is sent to the cloud server so that the cloud server generates the module update instruction according to the version information.

In one embodiment, the edge node periodically sends the version information of each unit in the edge node to the cloud server through the auxiliary unit and/or the master unit. The cloud server receives the version information of each unit, compares the version information of each unit with the current version information of each unit recorded in the cloud server, uses the unit whose received version information is different from current version information according to a comparison result as the to-be-updated module, and then generates the module update instruction including the information about the to-be-updated module. The current version information of each unit may be the latest version information or any version information set by the user.

The version information of each unit is sent to the cloud server so that the cloud server generates the module update instruction according to the version information, achieving the effect of automatically updating each unit in the edge node. In this manner, manual updating is not required, and labor cost is saved.

In one embodiment, after "using the unit whose the received version information is different from the current version information according to the comparison result as the to-be-updated module", the method further includes the step described below.

The cloud server controls a client to display an update button and generates the module update instruction according to the touch operation of the user on the update button.

In one embodiment, data interaction is performed between the cloud server and the client. The cloud server sends an update confirmation instruction to the client to control the client to generate the update button and display the update button to the user. If the user performs the touch operation on the update button, such as clicking or double-clicking the update button, the user agrees to the update, and correspondingly the cloud server generates the module update instruction according to the touch operation of the user on the update button. If the user does not perform the touch operation on the update button, and the generation duration of the update button exceeds the preset time threshold, the cloud server confirms that the user agrees to update none of the units in the edge node, and correspondingly the module update instruction will not be generated. In one embodiment, all to-be-updated modules may be displayed in the client for the user to select and determine an unit allowed to be updated, and the cloud server generates the information about the to-be-updated module according to the unit allowed to be updated.

The cloud server controls the client to display the update button and generates the module update instruction according to the touch operation of the user on the update button so that the user can know the situation of the to-be-updated module and then can actively intervene in the update according to the requirements of the user.

Figure 2A:
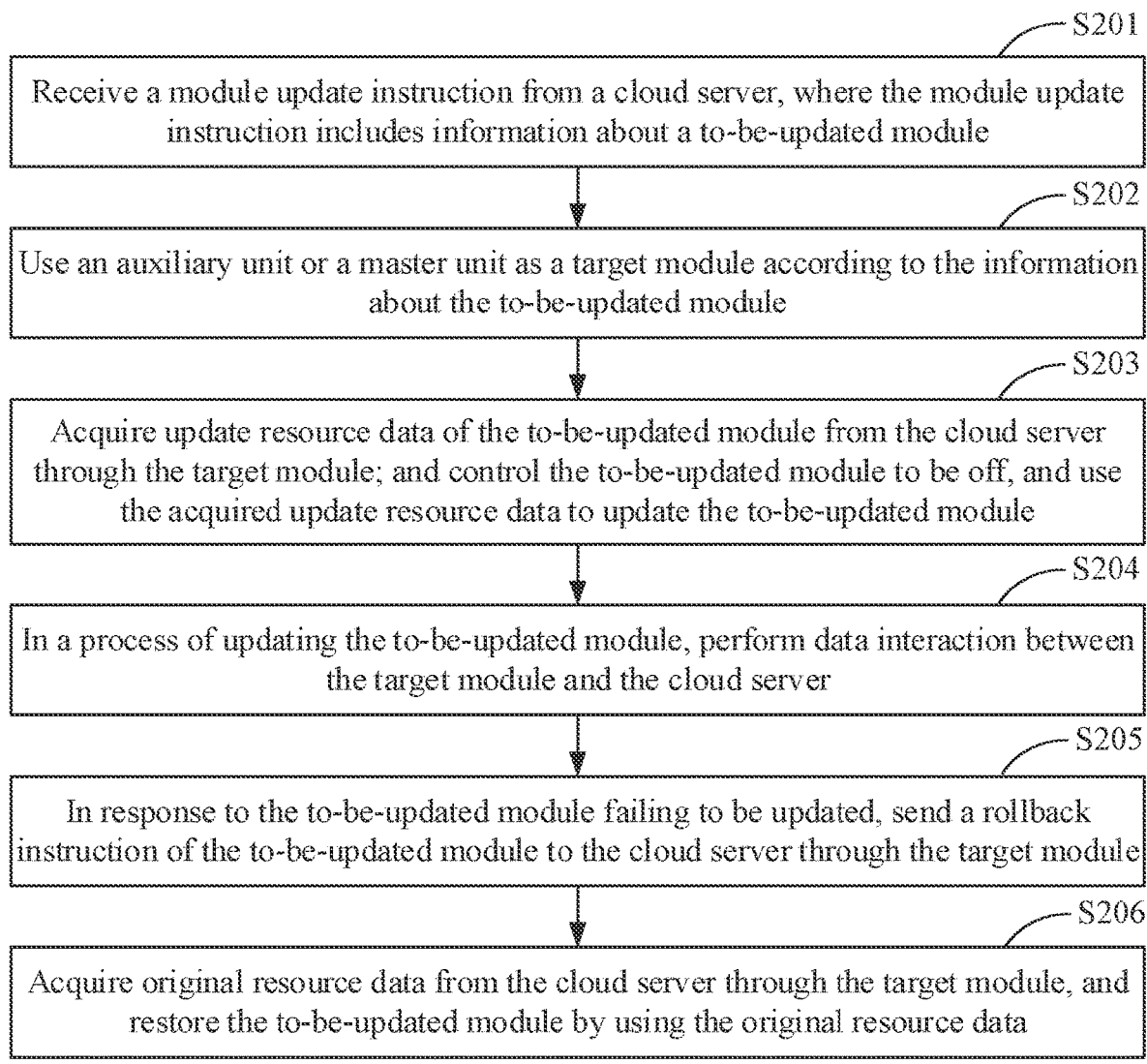
FIG. 2A is a flowchart of a method for updating an edge node according to an embodiment of the present disclosure.

FIG. 2A is a flowchart of a method for updating an edge node according to an embodiment of the present disclosure.

The solution is further optimized and extended based on the preceding solution and may be combined with the preceding various embodiments.

As shown in FIG. 2A, the method may include the steps described below.

In S201, a module update instruction is received from a cloud server, where the module update instruction includes information about a to-be-updated module.

In S202, an auxiliary unit or a master unit is used as a target module according to the information about the to-be-updated module.

In S203, update resource data of the to-be-updated module is acquired from the cloud server through the target module; and the to-be-updated module is controlled to be off, and the acquired update resource data is used to update the to-be-updated module.

In one embodiment, in response to the information about the to-be-updated module being the master unit, the auxiliary unit is used as the target module, the update resource data of the master unit is acquired from the cloud server through the auxiliary unit, the master unit is controlled to be off, and the acquired update resource data is used to update the master unit.

In one embodiment, the auxiliary unit acquires the update package of the master unit from the cloud server according to the identification information of the master unit, controls the master unit to be off, that is, stop operation, and uses the update package of the master unit to update the master unit.

In one embodiment, the module update instruction further includes the update package of the to-be-updated module. That is, the cloud server generates the module update instruction according to the information about the to-be-updated module and the corresponding update package. The auxiliary unit determines the update package corresponding to the master unit according to the identification information of the master unit, controls the master unit to be off, and directly uses the update package corresponding to the master unit to update the master unit.

In another embodiment, in response to the information about the to-be-updated module being the auxiliary unit or another unit, the master unit is used as the target module, the update resource data of the auxiliary unit or another unit is acquired from the cloud server through the target module, the auxiliary unit or another unit is controlled to be off, and the acquired update resource data is used to update the auxiliary unit or another unit.

In one embodiment, the master unit acquires the update package of the auxiliary unit or another unit from the cloud server according to the identification information of the auxiliary unit or another unit, controls the auxiliary unit or another unit to be off, that is, stop operation, and uses the update package of the auxiliary unit to update the auxiliary unit or uses the update package of another unit to update another unit.

In one embodiment, the module update instruction further includes the update package of the to-be-updated module. That is, the cloud server generates the module update instruction according to the information about the to-be-updated module and the corresponding update package. The master unit determines the update package of the auxiliary unit or another unit according to the identification information of the auxiliary unit or another unit, controls the auxiliary unit or another unit to be off, and directly uses the update package of the auxiliary unit to update the auxiliary unit or uses the update package of another unit to update another unit.

In S204, in a process of updating the to-be-updated module, data interaction is performed between the target module and the cloud server.

In S205, in response to the to-be-updated module failing to be updated, a rollback instruction of the to-be-updated module is sent to the cloud server through the target module.

In one embodiment, in the process of updating the to-be-updated module, the target module periodically sends the update state of the to-be-updated module to the cloud server, and in response to the to-be-updated module failing to be updated, the target module sends the rollback instruction of the to-be-updated module to the cloud server.

In one embodiment, in response to the information about the to-be-updated module being the master unit, the auxiliary unit sends the rollback instruction of the master unit to the cloud server if the master unit fails to be updated.

In one embodiment, in response to the information about the to-be-updated module being the auxiliary unit or another unit, the master unit sends the rollback instruction of the auxiliary unit or another unit to the cloud server if the auxiliary unit or another unit fails to be updated.

In S206, original resource data is acquired from the cloud server through the target module, and the to-be-updated module is restored by using the original resource data.

In one embodiment, the cloud server receives the rollback instruction sent by the target module and then controls the client to generate the rollback button and displays the rollback button to the user. If the user performs a touch operation on the rollback button, such as clicking or double-clicking the rollback button, the user agrees to the rollback, and correspondingly, the cloud server sends the original resource data stored in the cloud server and corresponding to the to-be-updated module to the target module according to the touch operation of the user on the rollback button. The target module uses the original resource data to restore the to-be-updated module. The original resource data may be the resource data of the to-be-updated module of the previous version or the resource data of any version set by the user.

In one embodiment, in response to the information about the to-be-updated module being the master unit, if the master unit fails to be updated, the auxiliary unit sends the rollback instruction of the master unit to the cloud server, receives the rollback package of the master unit sent by the cloud server, further controls the master unit that fails to be updated to be off, and uses the rollback package to restore the master unit.

In one embodiment, in response to the information about the to-be-updated module being the auxiliary unit or another unit, if the auxiliary unit or another unit fails to be updated, the master unit sends the rollback instruction of the auxiliary unit or another unit to the cloud server, receives the rollback package of the auxiliary unit or another unit sent by the cloud server, further controls the auxiliary unit or another unit that fails to be updated to be off, and uses the rollback package of the auxiliary unit to restore the auxiliary unit or the rollback package of another unit to restore another unit.

According to the solution of this embodiment, the update resource data of the to-be-updated module is acquired from the cloud server through the target module, the to-be-updated module is controlled to be off, and the acquired update resource data is used to update the to-be-updated module, thereby achieving the effect of updating the to-be-updated module through the target module. In response to the to-be-updated module failing to be updated, the rollback instruction of the to-be-updated module is sent to the cloud server through the target module, the original resource data is acquired from the cloud server through the target module, and the to-be-updated module is restored by using the original resource data, so that when the to-be-updated module in the edge node fails to be updated, the version rollback can be performed in time, and the normal operation of each unit can be ensured.

On the basis of the preceding embodiments, the three steps of A, B and C described below are further included.

A: In an initialization process of the edge node, the auxiliary unit is installed and started.

In one embodiment, the cloud server creates a cloud node; where, the cloud node includes multiple system units and user-specified functional units for data interaction, application function implementation and the like with the edge node. Further, the cloud server deploys the edge computing program of the cloud node in the edge node, and further the auxiliary unit is installed and started according to the edge computing program. The edge computing program is deployed in a manner including but not limited to online installation, offline installation package or mirror burning.

B: Installation resource data of the master unit is acquired through the auxiliary unit, and the master unit is installed by using the installation resource data of the master unit.

In one embodiment, the auxiliary unit performs data interaction with the cloud server, acquires the installation resource data of the master unit, and installs the master unit in the edge node by using the installation resource data of the master unit.

C: Installation resource data of another unit is acquired through the master unit, and the another unit is installed by using the installation resource data of the another unit.

In one embodiment, the master unit performs data interaction with the cloud server, acquires the installation resource data of another unit, and installs the another unit in the edge node by using the installation resource data of the another unit.

In the initialization process of the edge node, the auxiliary unit is installed and started. The installation resource data of the master unit is acquired through the auxiliary unit, and the master unit is installed by using the installation resource data of the master unit. The installation resource data of another unit is acquired through the master unit, and the another unit is installed by using the installation resource data of the another unit. Therefore, the effect of initializing the edge node is achieved.

Figure 2B:
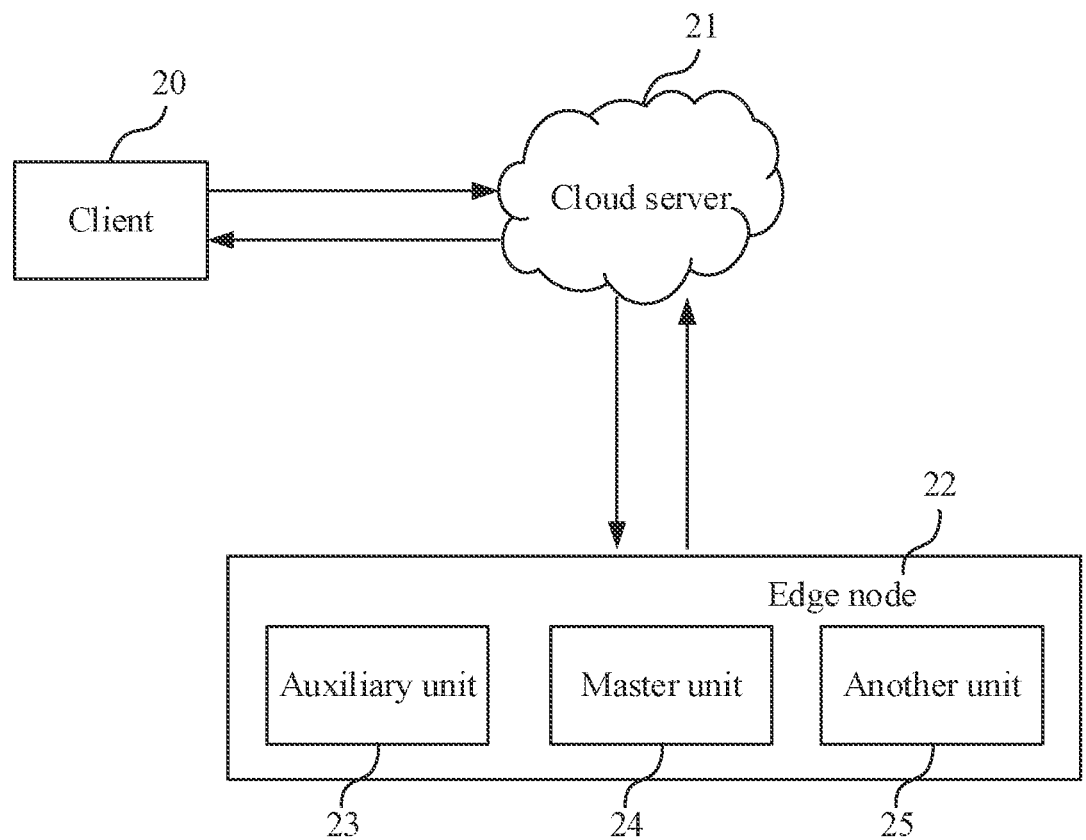
FIG. 2B is a schematic diagram of a scenario in which an edge node is updated according to an embodiment of the present disclosure.

FIG. 2B is a schematic diagram of a scenario in which an edge node is updated according to an embodiment of the present disclosure. As shown in FIG. 2B, a client 20, a cloud server 21 and an edge node 22 are included, and the edge node 22 includes an auxiliary unit 23, a master unit 24 and another unit 25. Data interaction is performed between the client 20 and the cloud server 21, and data interaction is performed between the cloud server 21 and the edge node 22.

A user controls at the client 20 the cloud server 21 to create a cloud node, then the cloud server 21 controls the edge node 22 to deploy an edge computing program, and the auxiliary unit 23 is installed and started. The auxiliary unit 23 acquires the installation resource data of the master unit 24 from the cloud server 21 and installs the master unit 24 by using the installation resource data of the master unit 24. The master unit 24 acquires the installation resource data of another unit 25 from the cloud server 21 and installs another unit 25 by using the installation resource data of another unit 25. The auxiliary unit 23 and the master unit 24 periodically report the version information of each unit to the cloud server 21. The cloud server 21 determines a to-be-updated module according to the version information and controls the client 20 to display an update button. After the user clicks the update button, the cloud server 21 sends a module update instruction to the auxiliary unit 23 and the master unit 24. In a case where information about the to-be-updated module is the master unit 24, the auxiliary unit 23 acquires update resource data of the master unit 24 from the cloud server 21 and updates the master unit 24 by using the acquired update resource data. In a case where information about the to-be-updated module is the auxiliary unit 23 or another unit 25, the master unit 24 acquires update resource data of the auxiliary unit 23 or another unit 25 from the cloud server 21 and updates the auxiliary unit 23 or another unit 25 by using the acquired update resource data. If the master unit 24 fails to be updated, the auxiliary unit 23 sends the rollback instruction of the master unit 24 to the cloud server, acquires the original resource data from the cloud server 21, and restores the master unit 24 by using the original resource data. If the auxiliary unit 23 or another unit 25 fails to be updated, the master unit 24 sends the rollback instruction of the auxiliary unit 23 or another unit 25 to the cloud server, acquires the original resource data from the cloud server 21, and restores the auxiliary unit 23 or another unit 25 by using the original resource data.

Figure 3:
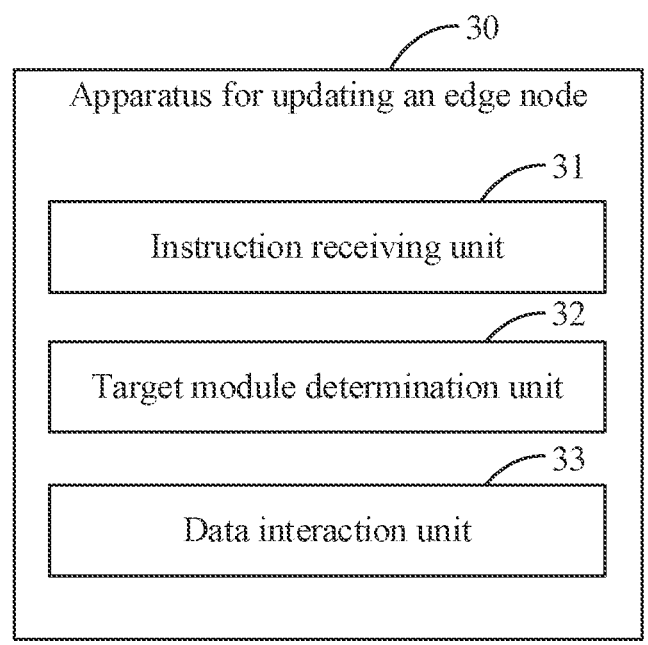
FIG. 3 is a structure diagram of an apparatus for updating an edge node according to an embodiment of the present disclosure.

FIG. 3 is a structure diagram of an apparatus for updating an edge node according to an embodiment of the present disclosure. This embodiment is applicable to the case of updating a to-be-updated module in the edge node. The apparatus of this embodiment may be implemented by software and/or hardware and may be integrated on any electronic device having a computing capability.

As shown in FIG. 3, the apparatus 30 for updating an edge node in this embodiment may include an instruction receiving unit 31, a target module determination unit 32 and a data interaction unit 33.

The instruction receiving unit 31 is configured to receive a module update instruction from a cloud server. The module update instruction includes information about a to-be-updated module.

The target module determination unit 32 is configured to use an auxiliary unit or a master unit as a target module according to the information about the to-be-updated module and update the to-be-updated module through the target module.

The data interaction unit 33 is configured to perform data interaction between the target module and the cloud server in a process of updating the to-be-updated module.

In one embodiment, the target module determination unit 32 is configured to perform the step described below.

In a case where the information about the to-be-updated module is the master unit, the auxiliary unit is used as the target module, and the master unit is updated through the auxiliary unit.

In a case where the information about the to-be-updated module is the auxiliary unit or another unit, the master unit is used as the target module, and the auxiliary unit or the another unit is updated through the master unit.

In one embodiment, the target module determination unit 32 is further configured to perform the steps described below.

Update resource data of the to-be-updated module is acquired from the cloud server through the target module.

The to-be-updated module is controlled to be off, and the acquired update resource data is used to update the to-be-updated module.

In one embodiment, the apparatus further includes a rollback instruction sending module configured to perform the steps described below.

In a case where the to-be-updated module fails to be updated, a rollback instruction of the to-be-updated module is sent to the cloud server through the target module.

Original resource data is acquired from the cloud server through the target module, and the to-be-updated module is restored by using the original resource data.

In one embodiment, the apparatus further includes an edge node deployment module configured to perform the steps described below.

In an initialization process of the edge node, the auxiliary unit is installed and started.

Installation resource data of the master unit is acquired through the auxiliary unit, and the master unit is installed by using the installation resource data of the master unit.

Installation resource data of another unit is acquired through the master unit, and the another unit is installed by using the installation resource data of the another unit.

The apparatus 30 for updating an edge node described in this embodiment of the present disclosure can perform the method updating an edge node described in the embodiment of the present disclosure and has functional units and beneficial effects corresponding to the method.

For content not described in detail in this embodiment, see description in any method embodiment of the present disclosure.

According to an embodiment of the present disclosure, the present disclosure further provides an electronic device, a readable storage medium and a computer program product.

Figure 4:
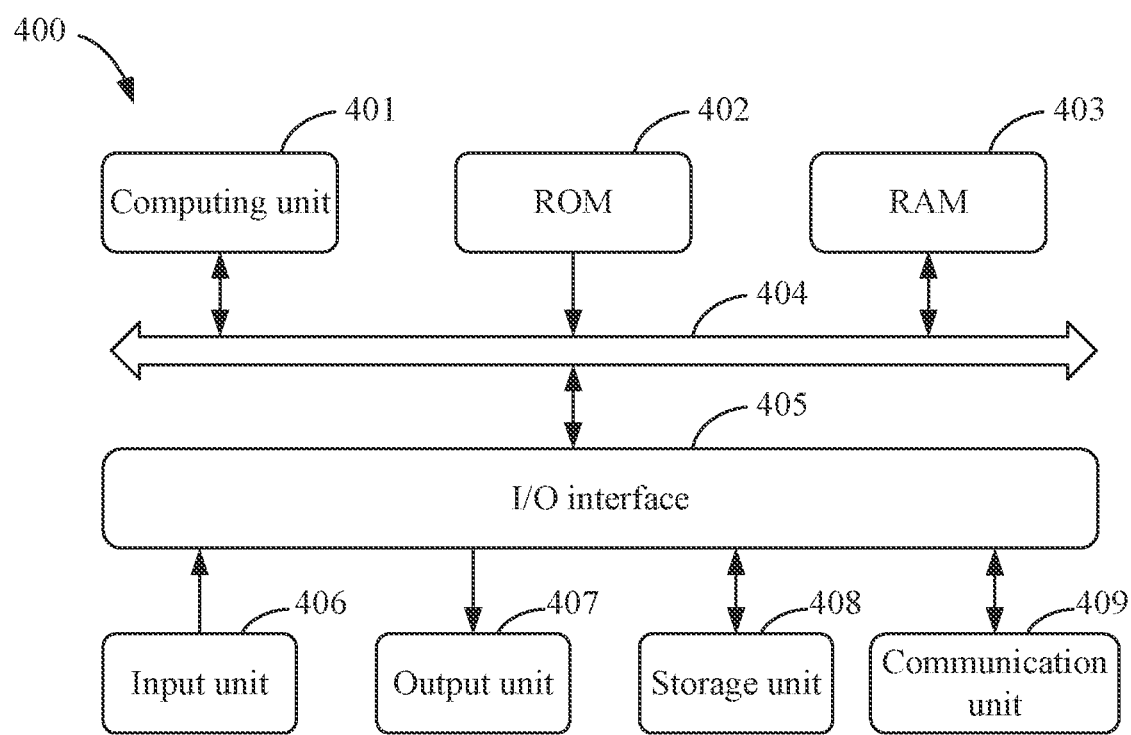
FIG. 4 is a block diagram of an electronic device for implementing a method for updating an edge node according to an embodiment of the present disclosure.

FIG. 4 is a block diagram of an example electronic device 400 for implementing the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 4, the device 400 includes a computing unit 401. The computing unit 401 may perform various appropriate actions and processing according to a computer program stored in a read-only memory (ROM) 402 or a computer program loaded into a random-access memory (RAM) 403 from a storage unit 408. The RAM 403 may also store various programs and data required for operations of the device 400. The computing unit 401, the ROM 402 and the RAM 403 are connected to each other by a bus 404. An input/output (I/O) interface 405 is also connected to the bus 404.

Multiple components in the device 400 are connected to the I/O interface 405. The multiple components in the device 400 include an input unit 406 such as a keyboard or a mouse, an output unit 407 such as various types of displays or speakers, a storage unit 408 such as a magnetic disk or an optical disk, and a communication unit 409 such as a network card, a modem or a wireless communication transceiver. The communication unit 409 allows the device 400 to exchange information/data with other devices over a computer network such as the Internet and/or over various telecommunication networks.

The computing unit 401 may be a general-purpose and/or special-purpose processing component having processing and computing capabilities. Examples of the computing unit 401 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 401 executes various methods and processing described above, such as the method for updating an edge node. For example, in some embodiments, the method for updating an edge node may be implemented as a computer software program tangibly contained in a machine-readable medium such as the storage unit 408. In some embodiments, part or all of computer programs may be loaded and/or installed on the device 400 via the ROM 402 and/or the communication unit 409. When the computer program is loaded to the RAM 403 and executed by the computing unit 401, one or more steps of the method for updating an edge node may be executed. Alternatively, in other embodiments, the computing unit 401 may be configured, in any other suitable manner (for example, by means of firmware), to execute the method for updating an edge node.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

Program codes for implementation of the method of the present disclosure may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used, with steps reordered, added or removed. For example, the steps described in the present disclosure may be executed in parallel, in sequence or in a different order as long as the desired result of the solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A method for updating an edge node, wherein the edge node comprises an auxiliary unit, a master unit and another unit, and the method comprises:

in an initialization process of the edge node, installing and starting the auxiliary unit;

acquiring installation resource data of the master unit through the auxiliary unit, and installing the master unit by using the installation resource data of the master unit;

acquiring installation resource data of the another unit through the master unit, and installing the another unit by using the installation resource data of the another unit;

receiving a module update instruction from a cloud server; wherein the module update instruction comprises information about a to-be-updated module;

using the auxiliary unit in the edge node or the master unit in the edge node as a target module according to the information about the to-be-updated module, and updating the to-be-updated module through the target module; and in a process of updating the to-be-updated module, performing data interaction between the target module and the cloud server;

wherein the using the auxiliary unit in the edge node or the master unit in the edge node as the target module according to the information about the to-be-updated module, and updating the to-be-updated module through the target module comprises:

in response to the information about the to-be-updated module being the master unit in the edge node, using the auxiliary unit in the edge node as the target module, and updating the master unit in the edge node through the auxiliary unit in the edge node.

2. The method of claim 1, wherein updating the to-be-updated module through the target module comprises:

acquiring update resource data of the to-be-updated module from the cloud server through the target module; and controlling the to-be-updated module to be off, and using the acquired update resource data to update the to-be-updated module.

3. The method of claim 2, wherein after using the acquired update resource data to update the to-be-updated module, the method further comprises:

in response to the to-be-updated module failing to be updated, sending a rollback instruction of the to-be-updated module to the cloud server through the target module; and acquiring original resource data from the cloud server through the target module, and restoring the to-be-updated module by using the original resource data.

4. An electronic device, comprising:

at least one processor; and a memory communicatively connected to the at least one processor, wherein the memory stores instructions executable by the at least one processor, and the processor is configured to:

in an initialization process of an edge node, install and start an auxiliary unit;

acquire installation resource data of a master unit through the auxiliary unit, and install the master unit by using the installation resource data of the master unit;

acquire installation resource data of another unit through the master unit, and install the another unit by using the installation resource data of the another unit;

receive a module update instruction from a cloud server; wherein the module update instruction comprises information about a to-be-updated module;

use the auxiliary unit in the edge node or the master unit in the edge node as a target module according to the information about the to-be-updated module, and update the to-be-updated module through the target module; and in a process of updating the to-be-updated module, perform data interaction between the target module and the cloud server;

wherein the processor is configured to use the auxiliary unit in the edge node or the master unit in the edge node as the target module according to the information about the to-be-updated module, and update the to-be-updated module through the target module in the following manners:

in response to the information about the to-be-updated module being the master unit in the edge node, using the auxiliary unit in the edge node as the target module, and updating the master unit in the edge node through the auxiliary unit in the edge node; and wherein the edge node comprises the auxiliary unit, the master unit and the another unit.

5. The electronic device according to claim 4, wherein the processor is configured to update the to-be-updated module through the target module in the following manners:

acquiring update resource data of the to-be-updated module from the cloud server through the target module; and controlling the to-be-updated module to be off, and using the acquired update resource data to update the to-be-updated module.

6. The electronic device according to claim 5, wherein the processor is configured to:

after using the acquired update resource data to update the to-be-updated module, in response to the to-be-updated module failing to be updated, send a rollback instruction of the to-be-updated module to the cloud server through the target module; and acquire original resource data from the cloud server through the target module, and restore the to-be-updated module by using the original resource data.

7. A non-transitory computer-readable storage medium storing computer instructions for causing a computer to perform:

receiving a module update instruction from a cloud server; wherein the module update instruction comprises information about a to-be-updated module;

in an initialization process of an edge node, installing and starting an auxiliary unit;

acquiring installation resource data of a master unit through the auxiliary unit, and installing the master unit by using the installation resource data of the master unit;

acquiring installation resource data of another unit through the master unit, and installing the another unit by using the installation resource data of the another unit;

using the auxiliary unit in the edge node or the master unit in the edge node as a target module according to the information about the to-be-updated module, and updating the to-be-updated module through the target module; and in a process of updating the to-be-updated module, performing data interaction between the target module and the cloud server;

wherein the using the auxiliary unit in the edge node or the master unit in the edge node as the target module according to the information about the to-be-updated module, and updating the to-be-updated module through the target module comprises:

in response to the information about the to-be-updated module being the master unit in the edge node, using the auxiliary unit in the edge node as the target module, and updating the master unit in the edge node through the auxiliary unit in the edge node; and wherein the edge node comprises the auxiliary unit, the master unit and the another unit.

8. The non-transitory computer-readable storage medium according to claim 7, wherein updating the to-be-updated module through the target module comprises:

acquiring update resource data of the to-be-updated module from the cloud server through the target module; and controlling the to-be-updated module to be off, and using the acquired update resource data to update the to-be-updated module.

9. The non-transitory computer-readable storage medium according to claim 8, wherein after using the acquired update resource data to update the to-be-updated module, the computer instructions cause the computer to perform:

in response to the to-be-updated module failing to be updated, sending a rollback instruction of the to-be-updated module to the cloud server through the target module; and acquiring original resource data from the cloud server through the target module, and restoring the to-be-updated module by using the original resource data.

* * * * *